United States Patent Office 3,322,492
Patented May 30, 1967

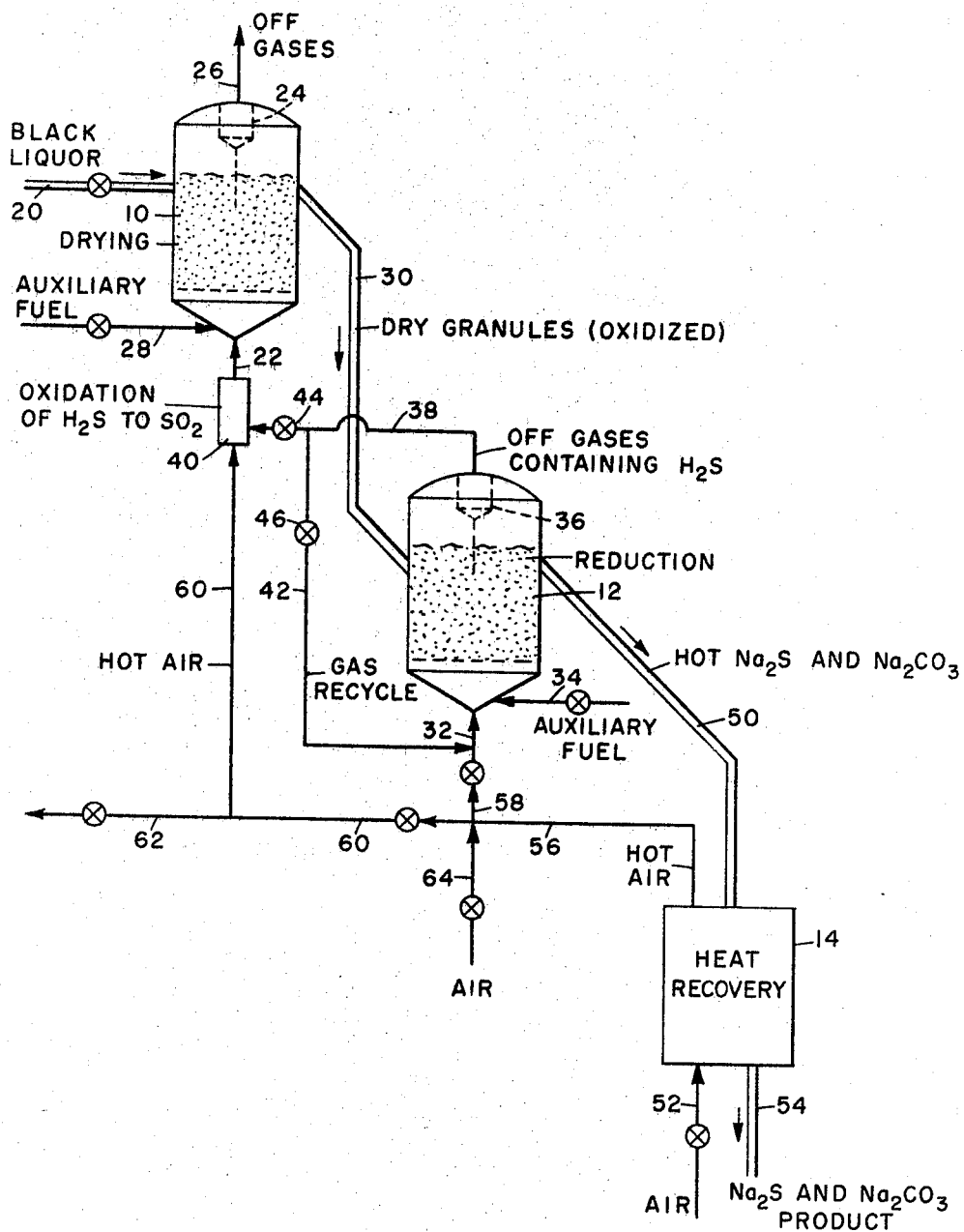

3,322,492
KRAFT BLACK LIQUOR RECOVERY
Harold William Flood, South Acton, Mass., assignor to Arthur D. Little, Inc., Cambridge, Mass., a corporation of Massachusetts
Filed July 31, 1964, Ser. No. 386,591
8 Claims. (Cl. 23—46)

This invention relates to the treatment of kraft black liquor for the recovery of values therefrom and more particularly to the treatment of such liquor by fluid bed technique in a manner to avoid the loss of valuable constituents and to provide a product suitable for use in the kraft pulping process.

One of the principal operations of a kraft paper mill is the recovery of the black liquor. At present, it is customary to evaporate the dilute liquor from the cooling operation, burn the concentrate under reducing conditions to form a molten smelt, and quench the smelt in water for clean-up and treatment for recycle to the digesters as cooking liquor. The dilute liquor contains about 16 to 20% total solids; evaporation raises this to about 60 to 65%. The solids consist of organic materials and sodium compounds, primarily $Na_2CO_3$ and $Na_2SO_4$. Reduction during the burning step eliminates the organic materials and leaves an inorganic product which is substantially all $Na_2S$ and $Na_2CO_3$. The quenched smelt is treated for recycle by adding make-up $Na_2SO_4$ and causticizing with quicklime.

There are a number of disadvantages to that system. The capital cost of the evaporator-boiler complex is extremely high; there is practically unavoidable loss of sulfur, which escapes into the atmosphere as $H_2S$; and the danger of boiler explosions is quite real. These explosions present a particular hazard as their causes are not entirely clear and they may occur without warning.

Among the objects of the present invention is the provision of a system for kraft black liquor treatment which eliminates the costly evaporator-boiler complex, and with it the explosion hazard of such arrangements. Another object is to preserve the sulfur and other values in the material being processed, and to stop the losses of such values which occur in prior art processes. Another object is the avoidance of foaming problems, which arise in some prior art processes of oxidizing the black liquor. Furthermore, the high temperatures customarily required in the prior art are not only unnecessary in my process but in general are inoperable. Other objects and advantages of my invention will in part be obvious and will in part appear hereinafter.

This invention accordingly comprises the several steps and the relation and order thereof with respect to each other, and the apparatus and parts thereof and its operation, as set forth in the following detailed disclosure. In this connection, reference is also made to the accompanying schematic drawing, which is to be considered as illustrative rather than limiting.

In accordance with the present invention, I provide in place of the evaporator-boiler complex a staged fluid bed system which avoids the production of a molten smelt and the need for very high operating temperatures. This system is composed of a first fluid bed for drying and sulfur recovery and a second fluid bed for gasifying the organic material and reducing the $Na_2SO_4$ to $Na_2S$. A third bed, for heat recovery, is also preferred but is not necessary; in fact it may not be a fluid bed. These first, second and third beds are designated by the numerals 10, 12 and 14, respectively, in the drawing.

Kraft black liquor containing say 16 to 20% total solids, including sodium in the form of $Na_2CO_3$ and $Na_2SO_4$, is fed through line 20 into fluid bed 10 where it is evaporated to dryness and where $SO_2$ entering with the fluidizing gases from line 22 is reacted with some of the $Na_2CO_3$ to produce $Na_2SO_4$, thus:

$$Na_2CO_3 + SO_2 + air \rightarrow Na_2SO_4 + CO_2 \qquad (1)$$

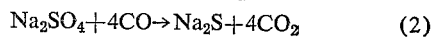

The procedure by which the $SO_2$ is generated will be explained hereinafter. Off gases, mostly $CO_2$, $H_2O$ and $N_2$, are withdrawn through a cyclone 24 or equivalent device and are vented through line 26. Auxiliary fuel, e.g. a combustible gas may be introduced through valve-controlled line 28, should additional heat be desired within fluid bed 10.

The dried product from fluid bed 10 passes out through conduit 30 in the form of dry prills or granules, consisting essentially of $NaSO_4$, $Na_2CO_3$ and the dry organic constituents of the black liquor. Conduit 30 leads to the reducing fluid bed 12, wherein the dried product is reduced by the decomposition of the organic constituents under the influence of heat. The principal reaction is:

$$Na_2SO_4 + 4CO \rightarrow Na_2S + 4CO_2 \qquad (2)$$

The CO is derived from the decomposition of the organic material under the reducing conditions present. Other reactions also take place, including that of $Na_2S$ with any residual $H_2O$ present to form $H_2S$. Air entering through line 32 serves to fluidize the particles in fluid bed 12. This air is preferably heated by any suitable means—advantageously by means of heat recovery bed 14. On the other hand, the heat for carrying out the reduction step in bed 12 may be provided by an auxiliary fuel, e.g. a combustible gas, introduced through valve-controlled line 34. Alternatively, both such heat sources may be used.

Off gases from bed 12 are withdrawn through a cyclone 36 or equivalent device into line 38. These off gases contain not only the $H_2S$ already mentioned, but $CO_2$, CO, $H_2$, and $N_2$, occurring as combustion or decomposition products from the reaction of the organic constituents and the air and/or auxiliary fuel. From line 38 they pass into element 40 where air or other suitable oxygen-bearing gas reacts with the $H_2S$, in the presence of a conventional catalyst for the purpose, to form $SO_2$. This $SO_2$, together with the other above-mentioned gases from line 38, is the gas above referred to which is led through line 22 to fluidize the contents of bed 10. If desired, a portion of the gas passing through line 38 may be by-passed through line 42 to line 32. This may be done if the gaseous effluent through line 38 is greater than desired for fluidizing and drying the fluid bed 10. This excess could of course be vented, but the by-passing conserves heat. The relative amounts of gases directed from line 38 into element 40 and line 42 are governed by valves 44 and 46 respectively. The hot solid product from fluid bed 12 consisting essentially of $Na_2S$ and $Na_2CO_3$ in the form of dry prills or granules, is then preferably led through a conduit or other conveying means 50 to a heat recovery bed or unit 14. There it is heat-exchanged in any suitable manner (e.g. in a fluid bed) with air entering through line 52, and passes out through conduit 54.

As already stated, this heat-exchange step is not required for satisfactory operation of the process, but is a definitely desirable operating economy. In any event, the final product emerging from conduit 54 and consisting essentially of $Na_2S$ and $Na_2CO_3$, is mixed in water with additional $Na_2SO_4$ and causticized in conventional fashion, whereupon it is ready for reuse in the pulping process.

The heated air from bed 14 passes out through line 56 and is then divided into two streams, one leading through line 58 to line 32 which as already stated, provides the fluidizing gas for the reducing bed 12, and the other leading through line 60 to element 40 for the purpose already explained. Should the quantity of air and its heat content be more than is required for such purposes, an appropriate quantity may be bled off through line 62. On the other hand, if more air or other gases, heated or not, be required for those purposes, it may be led in through line 64. Lines 58, 60, 62 and 64 are controlled by valves as shown, so that the air or other gas may be directed as desired.

As an example of the operation of this process, the dilute black liquor from the cooking process, at about 20% solids content, enters fluid bed 10 and there is dried at a temperature of about 175° C. Temperatures below about 150° C. do not give sufficient drying unless the treatment time is unduly prolonged. Temperatures above about 225° C. however result in undesirable side reactions, principally combustion and distillation of the organic constituents and consequent tendency toward reducing conditions.

The dried product is reduced in fluid bed 12 at a temperature of about 800° C. Operation at these temperatures is self-sustaining, once initiated, even without heat from bed 14 or from any of auxiliary sources 28, 34 or 64. Any residual reducing gases, primarily CO, from bed 12 are burned in bed 10, which is under neutral or slightly oxidizing conditions.

The reaction in fluid bed 12 takes place at a low enough temperature that the $Na_2CO_3$ does not react or decompose to any significant extent. As there is residual or bound moisture in the feed to bed 12, and/or due to the reactions therein, and also since the temperature is high enough, some $H_2S$ is formed by the reaction:

$$Na_2S + CO_2 + H_2O \rightarrow Na_2CO_3 + H_2S \quad (3)$$

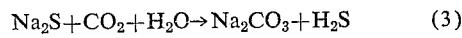

About 20 to 30% of the $Na_2S$ is thus reacted under the conditions indicated. The resulting $H_2S$ is burned to $SO_2$ in element 40 as already described.

The temperature in fluid bed 12 is kept below that at which there is any significant melting of $Na_2CO_3$, i.e below about 850° C. At the temperatures employed the dissociation pressure of $Na_2CO_3$ is low—less than 10 mm. Hg at atmospheric pressure. The auxiliary fuel added to bed 10 or bed 12 may also be introduced in the form of pulverized solid fuel, e.g. ground bark, coal fines, etc. Such introduction may be at any appropriate place, e.g. at the top of the unit, instead of at the bottom as illustrated; and instead of a gaseous auxiliary fuel being introduced at lines 28 or 34, a liquid auxiliary fuel may be used.

The form which bed 14 takes is not critical as long as an effective heat interchange is effected. Since the heat exchange is between different phases (gaseous and solid) and no significant reactions take place, the exchange is preferably direct. Hence it is merely necessary to cause the product from conduit 50 to fall through a rising current of air, and to regulate the air velocity and the length of the passage (hence the exposure time) so as to achieve the desired heating of the air and cooling of the particles.

Other modifications of this invention may occur to those skilled in this art. Therefore, I do not wish to be limited to the disclosure set forth above, but only by the scope of the appended claims.

I claim:

1. A process for the treatment of kraft black liquor to recover values therefrom, comprising the steps of feeding said liquor to a drying and reacting zone, subjecting said liquor in said zone to the action of a fluidizing drying gas containing sulfur dioxide, under the conditions of a fluid bed, to provde a particulate dry product consisting essentially of sodium sulfate, sodium carbonate and organic material, conveying said dry product into a reducing zone, subjecting said product, while in said zone, to fluidizing conditions and to heat sufficient to decompose said organic material and reduce the sodium sulfate to sodium sulfide, together with the production of some hydrogen sulfide but without substantial effect on the sodium carbonate, and removing said hydrogen sulfide from said second zone and oxidizing it to produce the aforementioned sulfur dioxide.

2. A process in accordance with claim 1 wherein the hot product from said reducing zone, consisting essentially of sodium carbonate and sodium sulfide, is brought into heat-exchange relation with a fluid cooling medium in a heat recovery zone to recover the heat of said product while cooling it.

3. A process in accordance with claim 2 wherein said heat exchange is carried out under the conditions of a fluid bed.

4. A process for the treatment of kraft black liquor to recover values therefrom, comprising the steps of subjecting said liquor to fluidization in a first zone by a gas containing sulfur dioxide, and at a temperature between about 150° C. and 225° C., to produce a dry product consisting essentially of sodium sulfate, sodium carbonate and organic material, subjecting said dry product to fluidization in a second zone by a hot gas, at temperature sufficient to decompose said organic material and provide reducing conditions such that the sodium sulfate is reduced to sodium sulfide, and some hydrogen sulfide is produced, but insufficient to cause any significant melting or dissociation of said sodium carbonate, removing said hydrogen sulfide in the gaseous effluent from said second zone, and oxidizing it to form the aforesaid sulfur dioxide, subjecting the solid product of said second zone to fluidization by air in a third zone, whereby said product is cooled by heat exchange with said air, and leading the resulting heated air into said second zone to fluidify the solids therein.

5. A process in accordance with claim 4 wherein said kraft black liquor has a solids content of about 16 to 20%.

6. A process in accordance with claim 4 wherein a portion of said gaseous effluent from the second zone is recycled to form a part of the fluidizing gas for said second zone.

7. A process in accordance with claim 4 wherein an auxiliary fuel is burned to produce additional heat in said first zone.

8. A process in accordance with claim 4 wherein an auxiliary fuel is burned to produce additional heat in said second zone.

References Cited

UNITED STATES PATENTS

| Re. 19,240 | 7/1934 | Goodell | 23—48 |
| 2,406,581 | 8/1946 | Bergstrom et al. | 23—48 |
| 2,467,855 | 4/1949 | Read | 23—1 |
| 2,570,460 | 10/1951 | Kress | 23—46 |
| 2,965,449 | 12/1960 | Jukkola | 23—200 |
| 3,073,672 | 1/1963 | Cederquist | 23—48 |
| 3,083,077 | 3/1963 | Bjorkman et al. | 23—48 |

FOREIGN PATENTS

| 723,108 | 2/1955 | Great Britain. |
| 776,331 | 6/1957 | Great Britain. |
| 909,866 | 11/1962 | Great Britain. |
| 141,861 | 1/1961 | U.S.S.R. |

OSCAR R. VERTIZ, *Primary Examiner.*

G. T. OZAKI, *Assistant Examiner.*